(12) United States Patent
Lee et al.

(10) Patent No.: US 8,188,576 B2
(45) Date of Patent: May 29, 2012

(54) COMPOUND FOR FILLING SMALL GAPS IN A SEMICONDUCTOR DEVICE, COMPOSITION INCLUDING THE COMPOUND, AND METHOD OF FABRICATING A SEMICONDUCTOR CAPACITOR

(75) Inventors: Sung Jae Lee, Gyeonggi-do (KR); Hee Jae Kim, Gyeonggi-do (KR); Tae Ho Kim, Gyeonggi-do (KR); Sang Geun Yun, Gyeonggi-do (KR); Chang Soo Woo, Gyeonggi-do (KR)

(73) Assignee: Cheil Industries, Inc., Gumi-si, Kyeongsangbuk-do (KR)

( * ) Notice: Subject to any disclaimer, the term of this patent is extended or adjusted under 35 U.S.C. 154(b) by 0 days.

(21) Appl. No.: 13/038,608

(22) Filed: Mar. 2, 2011

(65) Prior Publication Data

US 2011/0151640 A1    Jun. 23, 2011

Related U.S. Application Data

(63) Continuation of application No. PCT/KR2008/007839, filed on Dec. 31, 2008.

(30) Foreign Application Priority Data

Sep. 2, 2008    (KR) .......................... 10-2008-0086383

(51) Int. Cl.
*H01L 23/58*    (2006.01)
(52) U.S. Cl. ................. 257/632; 257/642; 257/E21.277; 438/790; 428/447
(58) Field of Classification Search .................. 438/787, 438/790; 257/632, 641, 642, E21.277; 528/10, 528/33, 34, 35, 41, 43; 428/447; 427/372, 427/387
See application file for complete search history.

(56) References Cited

U.S. PATENT DOCUMENTS

| | | | |
|---|---|---|---|
| 6,410,151 B1 * | 6/2002 | Kurosawa et al. | ............ 428/447 |
| 2001/0018161 A1 | 8/2001 | Hashimoto | |
| 2004/0028915 A1 | 2/2004 | Shibuya et al. | |
| 2009/0273070 A1 | 11/2009 | Tendou et al. | |

FOREIGN PATENT DOCUMENTS

| WO | WO 2005/038863 A2 | 4/2005 |
|---|---|---|
| WO | WO 2007/066763 A1 | 6/2007 |
| WO | WO 2008/136567 A1 | 11/2008 |

OTHER PUBLICATIONS

International Search Report in PCT/KR2008/007839 dated, Aug. 10, 2009 (Lee, et al.).

* cited by examiner

*Primary Examiner* — Julio J Maldonado
(74) *Attorney, Agent, or Firm* — Lee & Morse, P.C.

(57) ABSTRACT

A compound for filling small gaps in a semiconductor device, a composition for filling small gaps in a semiconductor device, and a method of fabricating a semiconductor capacitor, the compound including hydrolysates prepared by hydrolysis, in the presence of an acid catalyst, of compounds represented by Formulae 1, 2, and 3:

$$[RO]_3Si-[CH_2]_nR' \qquad (1)$$

wherein, in Formula 1, n is an integer from 0 to about 10, and R and R' are each independently a hydrogen atom, a C1-C12 alkyl group, or a C6-C20 aryl group;

$$HOOC[CH_2]_nR_2Si-O-SiR'_2[CH_2]_nCOOH \qquad (2)$$

wherein, in Formula 2, each n is independently an integer from 0 to about 10, and R and R' are each independently a C1-C12 alkyl group or a C6-C20 aryl group; and $$R_3Si-O-X \qquad (3)$$

wherein, in Formula 3, X is R' or SiR'$_3$, and R and R' are each independently a C1-C12 alkyl group or a C6-C20 aryl group, or a polycondensate prepared by polycondensation of the hydrolysates represented by Formulae 1, 2, and 3.

15 Claims, No Drawings

COMPOUND FOR FILLING SMALL GAPS IN A SEMICONDUCTOR DEVICE, COMPOSITION INCLUDING THE COMPOUND, AND METHOD OF FABRICATING A SEMICONDUCTOR CAPACITOR

CROSS-REFERENCE TO RELATED APPLICATION

This application is a continuation of pending International Application No. PCT/KR2008/007839, entitled "Compound for Filling Small Gaps in Semiconductor Device, Composition Comprising the Compound and Process for Fabricating Semiconductor Capacitor," which was filed on Dec. 31, 2008, the entire contents of which are hereby incorporated by reference for all purposes.

BACKGROUND

1. Field

The embodiments relate a compound for filling small gaps in a semiconductor device, a composition including the compound, and a method of fabricating a semiconductor capacitor.

2. Description of the Related Art

Polymers may be used to fill small gaps in semiconductor devices. For example, carbon-based polymers may be used. Miniaturization of semiconductor devices has led to a reduction in the size of holes to below 70 nm.

SUMMARY

Embodiments are directed to a compound for filling small gaps in a semiconductor device, a composition including the compound, and a method of fabricating a semiconductor capacitor.

The embodiments may be realized by providing a compound for filling small gaps in a semiconductor device, the compound including hydrolysates prepared by hydrolysis, in the presence of an acid catalyst, of compounds represented by Formulae 1, 2, and 3:

$$[RO]_3Si\text{—}[CH_2]_nR' \quad (1)$$

wherein, in Formula 1, n is an integer from 0 to about 10, and R and R' are each independently a hydrogen atom, a C1-C12 alkyl group, or a C6-C20 aryl group;

$$HOOC[CH_2]_nR_2Si\text{—}O\text{—}SiR'_2[CH_2]_nCOOH \quad (2)$$

wherein, in Formula 2, each n is independently an integer from 0 to about 10, and R and R' are each independently a C1-C12 alkyl group, or a C6-C20 aryl group; and

$$R_3Si\text{—}O\text{—}X \quad (3)$$

wherein, in Formula 3, X is R' or SiR'$_3$, and R and R' are each independently a C1-C12 alkyl group or a C6-C20 aryl group, or a polycondensate prepared by polycondensation of the hydrolysates represented by Formulae 1, 2, and 3.

The compound includes the polycondensate, and the polycondensate has a weight average molecular weight of about 1,000 to about 30,000.

The compound includes the polycondensate prepared by polycondensation of the hydrolysates represented by Formulae 1, 2, and 3, and the polycondensate is a polymer having a repeating unit represented by Formula 4:

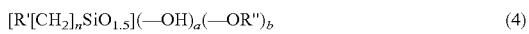

$$[R'[CH_2]_nSiO_{1.5}](\text{—}OH)_a(\text{—}OR'')_b \quad (4)$$

wherein, in Formula 4, R" is SiR$_3$ or SiR'$_2$[CH$_2$]$_n$COOH, R and R' are each independently a hydrogen atom, a C1-C12 alkyl group, or a C6-C20 aryl group, each n is independently an integer from 0 to 10, and a and b represent ratios of —OH and —OR" groups bonded to Si, respectively, and satisfy the relations 0<a<1, 0<b<1 and a+b=1.

The embodiments may also be realized by providing a composition for filling small gaps in a semiconductor device, the composition including the compound of an embodiment, and an organic solvent.

The composition may further include a crosslinking agent, or a mixture of a crosslinking agent with a crosslinking acid catalyst.

The crosslinking agent may include at least one of a melamine-based crosslinking agent, a substituted urea-based crosslinking agent, an epoxy-containing polymer, and derivatives thereof.

The crosslinking agent may be present in an amount of about 0.1 to about 30 parts by weight, based on 100 parts by weight of the compound.

The composition may include the mixture of the crosslinking agent and the crosslinking acid catalyst, and the crosslinking acid catalyst may include at least one of a mineral acid, sulfonic acid, oxalic acid, maleic acid, hexamic cyclohexylsulfonic acid, and phthalic acid.

The composition may include the mixture of the crosslinking agent and the crosslinking acid catalyst, and the crosslinking acid catalyst may be present in an amount of about 0.01 to about 10 parts by weight, based on 100 parts by weight of the compound.

The composition may further include at least one of stabilizer and a surfactant.

The composition may include the stabilizer, and the stabilizer may include at least one of an organic anhydride, and an inorganic anhydride.

The composition may include the stabilizer, and the stabilizer may be present in an amount of about 0.01 to about 10 parts by weight, based on 100 parts by weight of the compound.

The organic solvent may include at least one of diethylene glycol monomethyl ether, diethylene glycol diethyl ether, ethyl-3-ethoxy propionate, methyl-3-methoxy propionate, cyclopentanone, cyclohexanone, propylene glycol monomethyl ether acetate, propylene glycol dimethyl ether acetate, 1-methoxy-2-propanol, ethyl lactate, cyclopentanone, and hydroxyethyl acetate.

The organic solvent may be present in an amount of about 100 to about 3,000 parts by weight, based on 100 parts by weight of the compound.

The embodiments may also be realized by providing a method of fabricating a semiconductor capacitor, the method including forming an oxide mold on a semiconductor substrate, the oxide mold having patterned holes therein; depositing an electrode material on the oxide mold; filling the composition according to an embodiment in the patterned holes having the electrode material thereon; developing the resulting structure with a developing solution to remove the composition coated on a top portion of the electrode material layer, followed by baking; removing the top portion of the electrode material layer by etch back; and simultaneously removing the oxide mold and remaining composition filled in the patterned holes by wet etching to form a lower electrode.

DETAILED DESCRIPTION

Korean Patent Application No. 10-2008-0086383, filed on Sep. 2, 2008, in the Korean Intellectual Property Office, and entitled: "Compound for Filling Small Gaps in Semiconductor Device, Composition Comprising the Compound and Process for Fabricating Semiconductor Capacitor," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Like reference numerals refer to like elements throughout.

An embodiment provides a compound for filling small gaps in a semiconductor device. In an implementation, the compound may include (a) hydrolysates prepared by hydrolysis, in the presence of an acid catalyst, of compounds represented by Formulae 1, 2, and 3, below.

$$[RO]_3Si\text{—}[CH_2]_nR' \tag{1}$$

In Formula 1, n may be an integer from 0 to about 10, and R and R' may each independently be a hydrogen atom, a $C_1$-$C_{12}$ alkyl group, or a $C_6$-$C_{20}$ aryl group.

$$HOOC[CH_2]_nR_2Si\text{—}O\text{—}SiR'_2[CH_2]_nCOOH \tag{2}$$

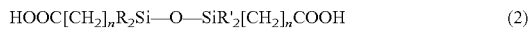

In Formula 2, n may be an integer from 0 to about 10, and R and R' may each independently be a $C_1$-$C_{12}$ alkyl group or a $C_6$-$C_{20}$ aryl group.

$$R_3Si\text{—}O\text{—}X \tag{3}$$

In Formula 3, X may be R' or $SiR'_3$, and R and R' may each independently be a $C_1$-$C_{12}$ alkyl group or a $C_6$-$C_{20}$ aryl group.

In an implementation, the compound may include (a) and/or (b), where (b) is a polycondensate prepared by polycondensation of the hydrolysates prepared from the compounds represented by Formulae 1, 2, and 3.

The compound represented by Formula 1 may contribute to formation of a backbone of the gap-filling compound. The compound represented by Formula 1 may undergo hydrolysis in a solution containing an acid catalyst to form hydrolysates. In an implementation, the hydrolysates may then be condensed to give a polycondensate.

The compound represented by Formula 2 may introduce carboxyl groups into ends of the polycondensate, the polycondensate being obtained by the reaction of the compound represented by Formula 1 in the presence of the acid catalyst. The terminal carboxyl groups of the polycondensate may maintain solubility of the polycondensate in a developing solution at a constant level and may prevent self-condensation of the polycondensate, even during storage. Accordingly, the gap-filling compound of an embodiment may exhibit excellent storage stability.

The compound represented by Formula 3 may cap terminal hydroxyl groups of the polycondensate obtained from the compound represented by Formula 1. This end-capping may prevent self-condensation of the polycondensate.

The end groups of the polycondensate may be protected by varying a weight ratio between the compounds represented by Formulae 2 and 3 to thereby control the dissolution rate of the polycondensate to a desired level.

For example, the gap-filling compound may be prepared by mixing about 40 to about 95 parts by weight of the compound represented by Formula 1, about 0.1 to about 30 parts by weight of the compound represented by Formula 2, and about 0.1 to about 30 parts by weight of the compound represented by Formula 3. Then, the mixture may be hydrolyzed in the presence of about 0.001 to about 5 parts by weight of an acid catalyst in about 5 to about 900 parts by weight of a solvent. In an implementation, the hydrolysates may then be polycondensed. The gap-filling compound may include a mixture of the hydrolysates and the polycondensate.

Maintaining the amount of the compound represented by Formula 2 at about 0.1 parts by weight or greater may help ensure that solubility of the gap-filling compound in a developing solution is not lowered and that a desired dissolution rate of the gap-filling compound is achieved. Maintaining the amount of the compound represented by Formula 2 at about 30 parts by weight or less may help prevent a sharp increase in the dissolution rate of the gap-filling compound, thereby preventing an increase in a number of defects in a subsequent spin coating step to form a film on a wafer.

Maintaining the amount of the compound represented by Formula 3 at about 0.1 parts by weight or greater may help prevent self-condensation of the polycondensate obtained from the compound represented by Formula 1, thereby ensuring a sufficient dissolution rate of the gap-filling compound in a developing solution preventing the gap-filling compound from becoming insoluble in the developing solution after storage. Maintaining the amount of the compound represented by Formula 3 at about 30 parts by weight of less may help ensure a complete reaction, thereby preventing a large difference in thickness of a film to be formed on a wafer in a subsequent spin coating step.

Any suitable acid catalyst may be used in the hydrolysis and polycondensation reactions without any particular limitation. For example, the acid catalyst may include one or more of nitric acid, sulfuric acid, p-toluenesulfonic acid monohydrate, diethyl sulfate, 2,4,4,6-tetrabromocyclohexadienone, benzoin tosylate, 2-nitrobenzyl tosylate, and alkyl esters of organic sulfonic acids.

The hydrolysis or condensation reaction may be suitably controlled by varying the kind, the amount, and the addition mode of the acid catalyst.

The polycondensate of the hydrolysates of the compounds represented by Formulae 1, 2, and 3 preferably has a weight average molecular weight of about 1,000 to about 30,000. In view of gap-filling properties, it is more preferable that the polycondensate has a weight average molecular weight of about 1,000 to about 10,000.

The polycondensate may be a polymer having a repeating unit represented by Formula 4:

$$[R'[CH_2]_nSiO_{1.5}](\text{—}OH)_a(\text{—}OR'')_b \tag{4}$$

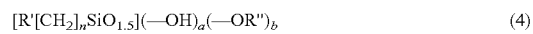

In Formula 4, R" may be $SiR_3$ or $SiR'_2[CH_2]_nCOOH$, R and R' may each independently be a hydrogen atom, a $C_1$-$C_{12}$ alkyl group, or a $C_6$-$C_{20}$ aryl group, n may be an integer from 0 to about 10, and a and b may represent ratios of —OH and —OR" groups bonded to Si, respectively, and may satisfy the relations 0<a<1, 0<b<1 and a+b=1.

Some of the terminal hydroxyl (—OH) groups of the polycondensate having the repeating unit represented by Formula 4 may be capped as —OR" groups. This end-capping may contribute to the storage stability of the polycondensate.

The embodiments also provide a composition for filling small gaps in a semiconductor device. For example, the composition may include an organic solvent and may include hydrolysates prepared from the compounds represented by Formulae 1, 2, and 3 in the presence of an acid catalyst and/or a polycondensate of the hydrolysates.

The hydrolysates and/or the polycondensate thereof are preferably present in an amount of about 1 to about 50 parts by weight, and more preferably about 1 to about 30 parts by weight, based on a total weight of the composition.

The solvent may be a single solvent or a mixture of different solvents. When a mixture of different solvents is used, at least one solvent of the mixture may be a high-boiling point solvent. The high-boiling point solvent may prevent formation of voids and may facilitate drying at a low rate of a film formed using the composition, thereby achieving improved flatness of the film. The high-boiling point solvent may refer to a solvent that is evaporated at a temperature lower than temperatures required to coat, dry and cure the composition of an embodiment.

Examples of the solvents may include, but are not limited to, diethylene glycol monomethyl ether, diethylene glycol diethyl ether, ethyl-3-ethoxy propionate, methyl-3-methoxy propionate, cyclopentanone, cyclohexanone, propylene glycol monomethyl ether acetate, propylene glycol dimethyl ether acetate, 1-methoxy-2-propanol, ethyl lactate, cyclopentanone, and hydroxyethyl acetate.

Baking may induce self-crosslinking of the gap-filling compound to cure the composition. This self-crosslinking may facilitate curing by baking of the composition without the use of an additional crosslinking agent. However, a further improvement in the crosslinking of the composition may be expected when a crosslinking agent is additionally used.

Non-limiting examples of the crosslinking agent may include, e.g., melamine-based crosslinking agents, substituted urea-based crosslinking agents, epoxy-containing polymers, and derivatives thereof. The crosslinking agent is preferably present in an amount of about 0.1 to about 30 parts by weight, based on 100 parts by weight of the gap-filling compound.

The composition of the present embodiment may further include a crosslinking acid catalyst to activate the crosslinking agent.

Examples of crosslinking acid catalysts suitable for use in the present embodiment may include, but are not limited to, mineral acids, sulfonic acid, oxalic acid, maleic acid, hexamic cyclohexylsulfonic acid, and phthalic acid.

The crosslinking acid catalyst is preferably present in an amount of about 0.01 to about 10 parts by weight, based on 100 parts by weight of the gap-filling compound.

A stabilizer may be added to the gap-filling composition of the present embodiment to prevent a decrease in storage stability of the composition during natural curing (which may occur due to self-crosslinking or crosslinking arising from the use of the crosslinking agent).

The stabilizer may include, e.g., an organic or inorganic anhydride. The stabilizer may be present in an amount of about 0.01 to about 10 parts by weight, based on 100 parts by weight of the gap-filling compound.

A surfactant may be added to the composition of the present embodiment to improve dispersibility, coating thickness uniformity, and gap-filling properties of the composition. Surfactants suitable for use in the present embodiment may include, e.g., i) non-ionic surfactants, for example, polyoxyethylene alkyl ethers, such as polyoxyethylene lauryl ether, polyoxyethylene stearyl ether, polyoxyethylene cetyl ether and polyoxyethylene oleyl ether, polyoxyethylene alkyl aryl ethers, such as polyoxyethylene nonyl phenol ether, polyoxyethylene•polyoxypropylene block copolymers, and polyoxyethylene sorbitan fatty acid esters, such as sorbitan monolaurate, sorbitan monopalmitate, sorbitan monostearate, sorbitan monooleate, polyoxyethylene sorbitan monostearate, polyoxyethylene sorbitan trioleate and polyoxyethylene sorbitan tristearate; ii) fluorinated surfactants, such as EFTOP EF301, EF303 and EF352 (commercially available from Tochem Products Co., Ltd.), MEGAFAC F171 and F173 (commercially available from Dainippon Ink and Chemicals Inc.), FLUORAD FC430 and FC431 (commercially available from Sumitomo 3M Ltd.), and ASAHI GUARD AG710, SURFLON S-382, SC101, SC102, SC103, SC104, SC105 and SC106 (commercially available from Asahi Glass Co., Ltd.); and iii) silicon-based surfactants, such as organosiloxane polymer KP341 (commercially available from Shinetsu Chemical Co., Ltd.). These surfactants may be used alone or in combination of two or more thereof. The surfactant is preferably added in an amount of about 0.001 to about 5 parts by weight, based on 100 parts by weight of the solids content of the composition.

The embodiments also provide a method of fabricating a semiconductor capacitor using the gap-filling composition. For example, the method may include forming an oxide mold (i.e., an oxide for patterning) on a semiconductor substrate to form patterned holes; depositing an electrode material on the oxide mold; filling the gap-filling composition in the patterned holes deposited with the electrode material; developing the resulting structure with a developing solution to remove the composition coated on a top portion of the electrode material layer, followed by baking; removing the top portion of the electrode material layer by etch back; and simultaneously removing the oxide mold and the remaining composition filled in the patterned holes by wet etching to form a lower electrode.

A suitable wet etchant that dissolves both the oxide and the composition may be used in the method of the present embodiment. A hydrofluoric acid solution is preferably used as the wet etchant. In an implementation, Ti/TiN may be used as the electrode material.

A dielectric layer may be formed on the lower electrode; and an upper electrode may be formed thereon to complete the fabrication of the semiconductor capacitor.

The following Examples and Comparative Examples are provided in order to set forth particular details of one or more embodiments. However, it will be understood that the embodiments are not limited to the particular details described. Further, the Comparative Examples are set forth to highlight certain characteristics of certain embodiments, and are not to be construed as either limiting the scope of the invention as exemplified in the Examples or as necessarily being outside the scope of the invention in every respect.

Example 1

661 g of methyltrimethoxysilane (corresponding to Formula 1), 119 g of 1,3-bis(3-carboxypropyl)tetramethyldisiloxane (corresponding to Formula 2), and 69 g of methoxytrimethylsilane (corresponding to Formula 3) were dissolved in 1,820 g of propylene glycol monomethyl ether acetate (PGMEA) in a 3-liter four-neck flask equipped with a mechanical agitator, a condenser, a dropping funnel and a nitrogen inlet tube. Then, 206 g of an aqueous nitric acid solution (1,000 ppm) was added thereto. Thereafter, the mixture was allowed to react at 50° C. for one hour. Methanol was removed from the reaction mixture under reduced pressure. The reaction was continued for one week while maintaining the reaction temperature at 60° C., yielding a polymer ('Polymer A') having a polydispersity (PD) of 2 and a weight average molecular weight ($M_w$) of 3,200. 10 g of Polymer A was diluted with 100 g of propylene glycol monomethyl ether acetate with sufficient stirring. Then, 0.1 g of a surfactant (Zonyl FSO-100, DuPont) was added thereto to prepare a gap-filling composition as a solution. A portion of the solution was spin-coated on a silicon wafer and baked at 90° C. for 50 seconds to form a 2,000 Å thick film. After the coated wafer was dipped in an aqueous solution of TMAH (2.38 wt %) at 23° C., the time required for the complete dissolution of the film (i.e. a break through time (BTT)) was measured using a dissolution rate (DR) tester (RDA-760, LTJ, Japan). The remaining portion of the solution was stored in a sealed bottle at room temperature.

Example 2

The procedure of Example 1 was repeated except that 130 g of propyltrimethoxysilane was used instead of methyltrimethoxysilane.

Example 3

The procedure of Example 1 was repeated except that 58 g of hexamethyldisiloxane was used instead of methoxytrimethylsilane.

Example 4

The procedure of Example 1 was repeated except that 1,820 g of cyclohexanone was used instead of propylene glycol monomethyl ether acetate (PGMEA).

Comparative Example 1

The procedure of Example 1 was repeated except that 1,3-bis(3-carboxypropyl)tetramethyldisiloxane was not used.

Comparative Example 2

The procedure of Example 1 was repeated except that methoxytrimethylsilane was not used.

Comparative Example 3

The procedure of Example 1 was repeated except that 1,3-bis(3-carboxypropyl)tetramethyldisiloxane and methoxytrimethylsilane were not used.

The gap-filling compositions prepared in Examples 1-4 and Comparative Examples 1-3 were tested for storage stability, e.g., variations in (BTT) and molecular weight, in accordance with the following method.

The compositions were stored at room temperature for 15 days, spin-coated in respective 6" silicon wafers under the same conditions, and baked at 90° C. for 50 seconds. The films were tested for BTT. The BTT values and molecular weights of the gap-filling compounds before and after the storage were measured. The results are shown in Tables 1 and 2, below.

TABLE 1

| | BTT | | Molecular weight (Mw) | |
|---|---|---|---|---|
| | Before storage | After storage (room temp., 15 days) | Before storage | After storage (room temp., 15 days) |
| Example 1 | 7.2 | 7.1 | 3,200 | 3,300 |
| Example 2 | 7.5 | 7.2 | 3,400 | 3,300 |
| Example 3 | 6.9 | 7.0 | 3,300 | 3,300 |
| Example 4 | 7.1 | 7.7 | 3,200 | 3,400 |

TABLE 2

| | BTT | | Molecular weight (Mw) | |
|---|---|---|---|---|
| | Before storage | After storage (room temp., 15 days) | Before storage | After storage (room temp., 15 days) |
| Comparative Example 1 | 7.5 | 47 | 4,100 | 5,900 |
| Comparative Example 2 | 7.2 | 56 | 3,700 | 4,300 |
| Comparative Example 3 | 6.8 | 129 | 3,900 | 7,200 |

As may be seen from the results in Table 1, the films formed in Examples 1-4 were dissolved in the alkaline developing solution; and the dissolution rates and the molecular weights of the gap-filling compounds were maintained without any significant change within the error range of the testing device, indicating good storage stability.

In contrast, it may be seen from the results in Table 2 that the BTT values of the films formed in Comparative Examples 1-3 in the developing solution were sharply increased after storage for 15 days at room temperature; and the molecular weights of the gap-filling compounds were markedly increased during storage.

By way of summation and review, a composition for filling small gaps in a semiconductor device should be able to completely fill holes in a substrate having an aspect ratio (i.e. height/diameter ratio) of 1 or more and a diameter of 70 nm or less by a general spin-coating technique; and the substrate should be able to be planarized to have a uniform thickness. In addition, no air voids and cracks should be present in the coating film. Furthermore, a thickness of the film should be uniform regardless of a density of the holes in the substrate. Moreover, the planarized film should be able to be removed at a desired rate by treatment with a hydrofluoric acid solution (i.e., not ashing) after thermal curing without leaving any residue inside the holes. In addition, the coating composition should be stable during storage.

For example, when carbon-based polymers are finally removed by ashing, inner surfaces of holes may be roughened, which may cause difficulty in applying dielectric materials in subsequent processing steps.

Moreover, a silicone polymer may undergo slow self-condensation between terminal hydroxyl (—OH) groups. This self-condensation may deteriorate the storage stability of the polymer. For example, the dissolution rate (DR) of an NSP material should be maintained constant during development, which may be an important step in a node separation process, in every development process. Self-condensation of hydroxyl groups of a silicone polymer may result in a gradual increase in the molecular weight of the silicone polymer and thus may retard the dissolution rate of the silicone polymer.

Thus, a composition for filling small gaps in semiconductor devices according to an embodiment may eliminate the need for ashing to reduce the cost of processing equipment and may be effectively removed by wet etching using a hydrofluoric acid solution for the removal of oxides present in patterned holes.

The NSP material according to an embodiment, which is capable of eliminating the need for ashing, may be filled in patterned holes and may then be removed by wet etching using a hydrofluoric acid solution for the removal of an oxide for patterning. Thus, according to the embodiments, the silicone polymer having a basic structure similar to that of the oxide or a composition including the silicone polymer may be effective as the NSP material.

The embodiments provide a node separation polymer (NSP) whose dissolution rate and molecular weight remain substantially unchanged during storage and that is dissolved at a desired rate in an alkaline developing solution.

The embodiments also provide a composition for filling small gaps in a semiconductor device that includes the NSP material to achieve good storage stability, thus being suitable for use in the fabrication of a semiconductor capacitor.

For example, the embodiments provide a node separation polymer (NSP) whose molecular weight remains unchanged during storage and that is dissolved at a desired rate in an alkaline developing solution without any significant change in dissolution rate (DR) during storage due to the presence of terminal carboxyl groups and capped hydroxyl groups.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope of the present invention as set forth in the following claims.

What is claimed is:

1. A compound for filling small gaps in a semiconductor device, the compound comprising:
hydrolysates prepared by hydrolysis, in the presence of an acid catalyst, of compounds represented by Formulae 1, 2, and 3:

$$[RO]_3Si-[CH_2]_nR' \tag{1}$$

wherein, in Formula 1, n is an integer from 0 to about 10, and R and R' are each independently a hydrogen atom, a C1-C12 alkyl group, or a C6-C20 aryl group;

$$HOOC[CH_2]_nR_2Si-O-SiR'_2[CH_2]_nCOOH \tag{2}$$

wherein, in Formula 2, each n is independently an integer from 0 to about 10, and R and R' are each independently a C1-C12 alkyl group, or a C6-C20 aryl group; and $$R_3Si-O-X \tag{3}$$

wherein, in Formula 3, X is R' or SiR'$_3$, and R and R' are each independently a C1-C12 alkyl group or a C6-C20 aryl group, or
a polycondensate prepared by polycondensation of the hydrolysates represented by Formulae 1, 2, and 3.

2. The compound as claimed in claim 1, wherein:
the compound includes the polycondensate, and
the polycondensate has a weight average molecular weight of about 1,000 to about 30,000.

3. The compound as claimed in claim 1, wherein:
the compound includes the polycondensate prepared by polycondensation of the hydrolysates represented by Formulae 1, 2, and 3, and
the polycondensate is a polymer having a repeating unit represented by Formula 4:

$$[R'[CH_2]_nSiO_{1.5}](-OH)_a(-OR'')_b \tag{4}$$

wherein, in Formula 4, R" is SiR$_3$ or SiR'$_2$[CH$_2$]$_n$COOH, R and R' are each independently a hydrogen atom, a C1-C12 alkyl group, or a C6-C20 aryl group, each n is independently an integer from 0 to 10, and a and b represent ratios of —OH and —OR" groups bonded to Si, respectively, and satisfy the relations 0<a<1, 0<b<1 and a+b=1.

4. A composition for filling small gaps in a semiconductor device, the composition comprising:
the compound as claimed in claim 1, and
an organic solvent.

5. The composition as claimed in claim 4, further comprising:
a crosslinking agent, or
a mixture of a crosslinking agent with a crosslinking acid catalyst.

6. The composition as claimed in claim 5, wherein the crosslinking agent includes at least one of a melamine-based crosslinking agent, a substituted urea-based crosslinking agent, an epoxy-containing polymer, and derivatives thereof.

7. The composition as claimed in claim 5, wherein the crosslinking agent is present in an amount of about 0.1 to about 30 parts by weight, based on 100 parts by weight of the compound.

8. The composition as claimed in claim 5, wherein:
the composition includes the mixture of the crosslinking agent and the crosslinking acid catalyst, and
the crosslinking acid catalyst includes at least one of a mineral acid, sulfonic acid, oxalic acid, maleic acid, hexamic cyclohexylsulfonic acid, and phthalic acid.

9. The composition as claimed in claim 5, wherein:
the composition includes the mixture of the crosslinking agent and the crosslinking acid catalyst, and
the crosslinking acid catalyst is present in an amount of about 0.01 to about 10 parts by weight, based on 100 parts by weight of the compound.

10. The composition as claimed in claim 4, further comprising at least one of stabilizer and a surfactant.

11. The composition as claimed in claim 10, wherein:
the composition includes the stabilizer, and
the stabilizer includes at least one of an organic anhydride, and an inorganic anhydride.

12. The composition as claimed in claim 10, wherein:
the composition includes the stabilizer, and
the stabilizer is present in an amount of about 0.01 to about 10 parts by weight, based on 100 parts by weight of the compound.

13. The composition as claimed in claim 4, wherein the organic solvent includes at least one of diethylene glycol monomethyl ether, diethylene glycol diethyl ether, ethyl-3-ethoxy propionate, methyl-3-methoxy propionate, cyclopentanone, cyclohexanone, propylene glycol monomethyl ether acetate, propylene glycol dimethyl ether acetate, 1-methoxy-2-propanol, ethyl lactate, cyclopentanone, and hydroxyethyl acetate.

14. The composition as claimed in claim 4, wherein the organic solvent is present in an amount of about 100 to about 3,000 parts by weight, based on 100 parts by weight of the compound.

15. A method of fabricating a semiconductor capacitor, the method comprising:
forming an oxide mold on a semiconductor substrate, the oxide mold having patterned holes therein;
depositing an electrode material on the oxide mold;
filling the composition as claimed in claim 4 in the patterned holes having the electrode material thereon;
developing the resulting structure with a developing solution to remove the composition coated on a top portion of the electrode material layer, followed by baking;
removing the top portion of the electrode material layer by etch back; and
simultaneously removing the oxide mold and remaining composition filled in the patterned holes by wet etching to form a lower electrode.

* * * * *